United States Patent [19]

Ziol

[11] Patent Number: 5,279,746
[45] Date of Patent: Jan. 18, 1994

[54] PROCESS AND APPARATUS FOR REMOVING RADON FROM WATER

[76] Inventor: Daniel Ziol, 1145 Daverick Dr., Pasadena, Calif. 91107

[21] Appl. No.: 894,599

[22] Filed: Jun. 5, 1992

[51] Int. Cl.$^5$ ............................................. C02F 1/58
[52] U.S. Cl. ............................ 210/750; 95/116; 95/159; 96/134; 210/97; 210/170; 210/188
[58] Field of Search .................... 55/66; 210/747, 750, 210/758, 170, 188, 202, 218, 911, 97; 95/116, 159; 96/134

[56] References Cited

U.S. PATENT DOCUMENTS

| | | | |
|---|---|---|---|
| 4,054,429 | 10/1977 | Ostojic et al. | 55/48 |
| 4,371,383 | 2/1983 | Rost | 55/194 |
| 4,869,832 | 9/1989 | Lamarre | 55/66 |
| 5,100,555 | 3/1992 | Matson | 55/66 |
| 5,149,343 | 9/1992 | Sowinski | 55/66 |

*Primary Examiner*—Ivars Cintins
*Attorney, Agent, or Firm*—Edgar W. Averill, Jr.

[57] ABSTRACT

A process for treating drinking water at greater than atmospheric pressure to remove radon and the apparatus for carrying out the process. The process involves introducing water under pressure into a pressure vessel maintained at a pressure about equal to the pressure of the water to be treated. This water is continuously fed onto the upper surface of a packed column and allowed to fall downwardly through the packed column. A gas is drawn upwardly through the packed column causing the radon gas to be expelled from the water into the gas, and the gas stream is forced through a carbon absorber. Preferably, the tank is cylindrical and has a blower which draws air upwardly through the packed column and then returns it downwardly through a gas conduit thereby continuously recirculating the gas. A carbon absorber also maintained at the same pressure as the pressure vessel is in the gas-full passageway and absorbs radon gas. The water level in the bottom of the pressure vessel is maintained by introducing pressurized gas through a control valve operated by a liquid level sensor.

8 Claims, 1 Drawing Sheet

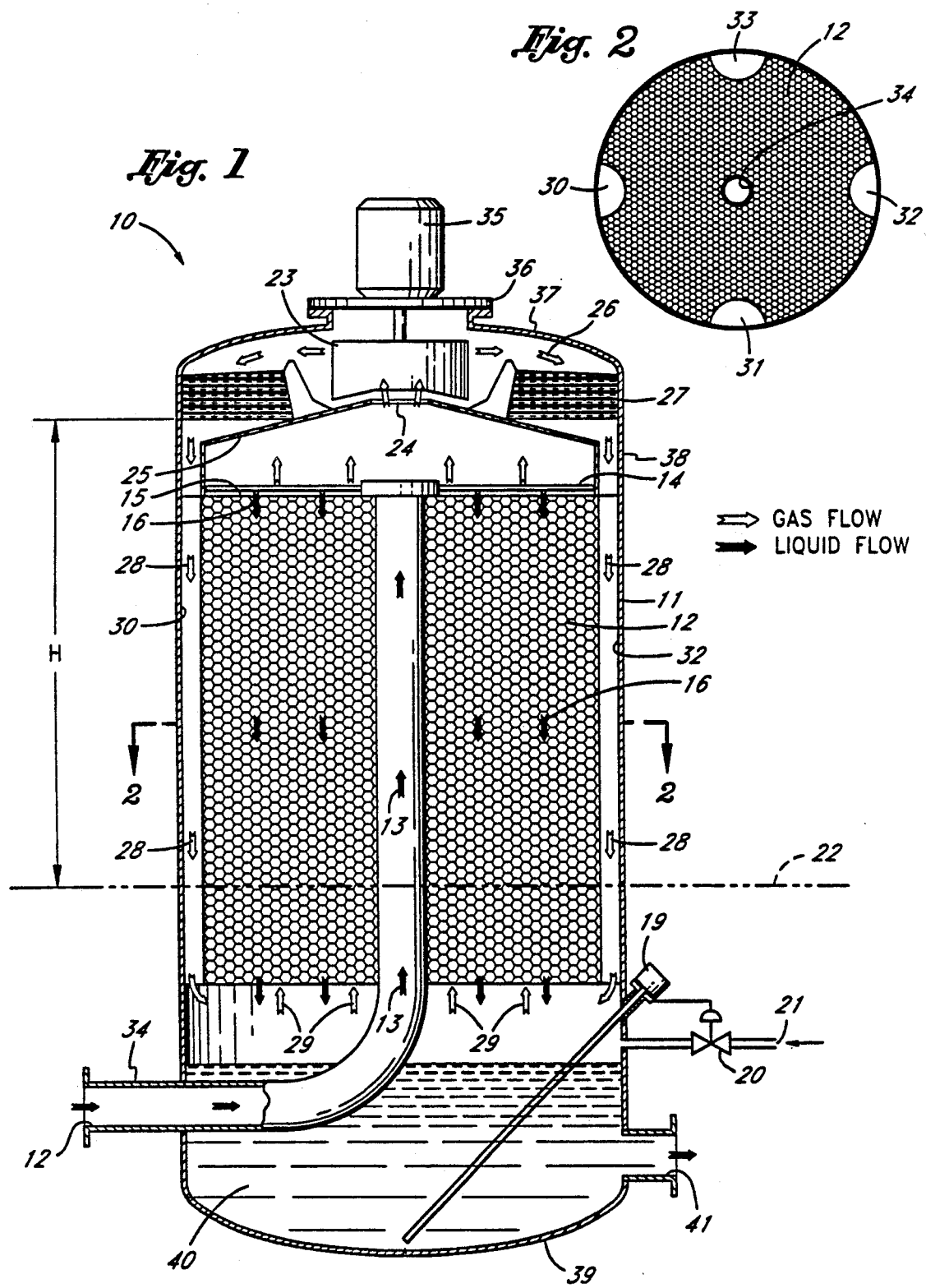

5,279,746

PROCESS AND APPARATUS FOR REMOVING RADON FROM WATER

BACKGROUND OF THE INVENTION

The field of the invention is water treatment, and the invention relates more particularly to processes for removing radon from drinking water.

It is well known that radon can be removed from drinking water by aeration of the water. The radon gas, being highly volatile, tends to be released from the water particularly when the water is aerated. While the present invention is directed toward radon removal, it is, of course, useful for removing other volatile contaminants present in potable water.

Various pieces of equipment have been suggested for radon removal such as that in U.S. Pat. No. 4,371,383. This process involves spraying water into a tank which has splash plates. An air blower circulates air through the spray of water and exhausts the air to the atmosphere. A similar approach is shown in U.S. Pat. No. 4,869,832 where water from a well is sprayed onto the top of a packed column and trickles downwardly through the column. An air blower moves air upwardly along the column and exhausts the air at the top of the column to the atmosphere. A similar process is shown in U.S. Pat. No. 5,045,215. This equipment uses a horizontal tray with baffles. As the water moves downwardly through this device, air is blown upwardly through the perforations frothing the water on the trays and evaporating the radon and other contaminants from the water. The contaminants are then vented to the atmosphere.

While such systems are effective to remove radon and other volatile contaminants, they merely vent these contaminants to the atmosphere. Furthermore, the water in the vessels is maintained at essentially atmospheric pressure during the treatment process and must be repressurized to bring it back to line pressure for distribution.

SUMMARY OF THE INVENTION

It is an object of the present invention to provide a radon-removing system and apparatus which is capable of treating water at line pressure in a closed system which provides water at only a slightly reduced pressure from that of the inlet water.

The present invention is for the process of removing radon from drinking water and the equipment for carrying out this process. The process involves the steps of introducing water to be treated under pressure into a pressure vessel maintained at a pressure about equal to that of the inlet water, continuously feeding the water under the upper surface of a packed column and allowing the water to fall downwardly through the packed column and drawing the gas upwardly through the packed column thereby conveying the radon expelled from the water into the gas stream. Next, the radon-laden gas stream is passed through a carbon absorber, and water which has passed through the column is continuously discharged from the base of the vessel.

The equipment used to carry out this process is a pressure vessel with a water inlet for feeding water to be treated to the pressure vessel. A packed column is within the pressure vessel, and means are provided for feeding the water onto the top of the packed column. A blower creates a gas circulation path upwardly through the packed column and recirculates the gas through a carbon absorber. Means are provided for maintaining a desired water level at the bottom of the pressure vessel. Preferably, this means feeds pressurized gas into the pressure vessel to maintain the desired water level.

BRIEF DESCRIPTION OF THE DRAWINGS

FIG. 1 is a cross-sectional view of the radon-removal system of the present invention.

FIG. 2 is a cross-sectional view taken along line 2—2 of FIG. 1.

DESCRIPTION OF THE PREFERRED EMBODIMENTS

A hydro-pneumatic radon remover is shown in cross-sectional view in FIG. 1 and indicated generally by reference character 10. The remover has a pressure vessel 11 which contains a packed column 12. Pressure vessel 11 is preferably installed so that it is partly below ground level 22 and partly above ground level 22. Although the term "packed column" is used herein, baffle plates, or other gravity-operated aeration devices, may also be used.

Water to be treated is fed at line pressure into water inlet 12 and moves upwardly in the direction of arrows 13 to a manifold 14 located above the top 15 of packed column 12. The water then trickles downwardly as indicated by arrows 16 and falls from the bottom 17 into the base of the pressure vessel 11. The water level 18 is controlled by a liquid level sensor 19 which provides an output to control valve 20 which controls the flow of pressurized gas 21 to maintain water level 18 at a desired level.

A blower 23 draws air upwardly through a blower inlet 24 in gas manifold 25 positioned above packed column 12. Blower 23 then circulates air in the direction of arrows 26, first outwardly and then downwardly through a carbon absorber 27. The carbon absorber 27 absorbs radon and other volatile gasses from the air stream after such volatile components have been volatilized from the downwardly flowing water indicated by arrow 16. The gas which has passed through the carbon absorber 27 moves downwardly, as indicated by arrows 28, and is once again pulled upwardly in the direction of arrows 29 through the packed column to provide a continuously recirculating gas flow. Typically, the gas will be simply pressurized air. Other gasses could be used if desired.

The gas moving downwardly around the column passes through four gas return passageways 30, 31, 32 and 33 shown best in FIG. 2. The water feed line is indicated by reference character 34 centrally located as shown in FIG. 2.

Blower 23 may be a simple turbine blade and is rotated by motor 35 positioned on a flange 36 at the top 37 of pressure vessel 11. As shown in FIG. 2, pressure vessel 11 has a cylindrical side wall 38 and a bottom 39.

Treated water 40 is maintained in the bottom of pressure vessel 11 and passes outwardly through water outlet line 41 at a pressure fractionally below that of the water inlet line 12.

There are two major benefits of the process and apparatus of the present invention. The first benefit is the elimination of the need for a secondary discharge pump to boost effluent pressure and flow. The second benefit is the elimination of any contaminant or gas discharge into the atmosphere of the stripping gasses during the continuous removal process. Most common air strippers, as indicated by the three above-referenced patents, operate at atmospheric pressure using ambient air as the stripping carrier. If the water source, that normally discharges into a pressurized distribution system, is connected to this type of stripper, a second pumping system must be used to reboost the water back to the distribution system pressure. The process and apparatus of the present invention uses the inlet pressure to maintain water flow into the rest of the system. The only loss in pressure is the height of the packed column. The gas charged inside pressure vessel 11 is maintained at a pressure equal to the system line pressure. Thus, when a gallon of water is forced into the vessel, an equal amount of water is forced out. On the stripping side of the system, air flow normally is drawn from ambient air and is discharged back to the atmosphere sometimes through an activated carbon absorber. In any case, the air discharged to the atmosphere falls under the regulation of local or federal air resources controls. In the process of the present invention, the stripping gas is maintained in a closed loop and totally contained safely within the system. The process of the present invention also allows for the use of a wide variety of alternate gasses.

Thus, the process of the present invention significantly reduces operating power costs and eliminates the discharge of contaminants. The process is quiet, externally attractive and capable of large volume throughput. Preferably, the carbon absorber is placed at the top of the pressure vessel at a height "H" above ground level 22. This height should be sufficient so that in the event the carbon absorber becomes radioactive from absorbed radon, the radiation is kept well above the level of operating personnel. A height of nine feet is believed appropriate.

In operation, after the carbon absorber has absorbed sufficient radon to require changing, the unit is shut down for a minimum of twenty-one days prior to exchanging the carbon absorber 27. This provides sufficient time for the radon gas to decay down to a level where the absorbate can be changed. Of course, the carbon absorber can be located in a separate unit external to pressure vessel 11, but it would still be maintained at the same pressure as the internal pressure of pressure vessel 11. Gas conduits and valves could be provided to reroute the gas flow when the absorber is sufficiently saturated with radon to facilitate the carbon bed replacement.

The throughput of the present equipment has been designed to permit 1800 gallons per minute water discharge rate. A pressure vessel having a diameter of nine feet and a height of twenty feet is anticipated, and an air flow rate of 4550 scfm is anticipated. A blower motor 35 of ten horsepower is believed adequate.

Thus, the process of the present invention provides a closed loop where no contaminants are exhausted to the atmosphere. It is quiet in operation, efficient in that it retains the inlet water pressure without significant reduction to the outlet and is reliable. While the water feed line is shown in the center of the packed column, it can, of course, be introduced near the top of pressure vessel 11. While the pressure vessel has been shown as a generally cylindrical pressure vessel, it could, of course, be spherical or otherwise shaped, although generally cylindrical is preferred.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for treating drinking water at greater than atmospheric pressure to remove radon therefrom comprising the steps of:
   introducing water to be treated under pressure into a pressure vessel maintained at a pressure about equal to the pressure of the water to be treated;
   continuously feeding the water on to the upper surface of a packed column and allowing the water to fall downwardly through said packed column;
   drawing a stripping gas upwardly through said packed column thereby causing radon gas to be expelled from said water into the stripping gas to result in a radon-containing stripping gas stream, said drawing step being carried out by an internal fan positioned above said packed column drawing gas upwardly through the column and a stripping gas passageway along the exterior of the packed column for passing gas downwardly for recirculation;
   forcing the radon-containing stripping gas stream through a carbon absorber to provide the stripping gas used in said drawing step; and
   continuously withdrawing treated water from the base of said vessel.

2. A hydro-pneumatic radon remover for removing radon gas from drinking water while maintaining the water under pressure, said remover comprising:
   a pressure vessel having a top, a bottom and side walls;
   a water inlet for introducing water to be treated under pressure from an external source into the pressure vessel;
   a packed column having a top spaced from the top of said pressure vessel and a bottom spaced from the bottom of said pressure vessel;
   a gas return passageway to convey gas exteriorly of said packed column;
   means for feeding the water to be treated onto the top of said packed column;
   a blower having an inlet and an outlet within said pressure vessel, said blower creating a gas circulation path upwardly through said packed column and downwardly through said gas return passageway;
   a carbon absorber positioned in said gas circulation path and under the same pressure as the internal of said pressure vessel;
   means for maintaining a desired water level in the bottom of the pressure vessel below the bottom of said packed column; and
   a water outlet line affixed to the pressure vessel, said water outlet line having a water inlet below the water level in the bottom of said pressure vessel.

3. The hydro-pneumatic radon remover of claim 2 wherein said means for feeding the water to be treated onto the top of said packed column comprises an extension of the water inlet line to the top of the packed column and a manifold for feeding the water onto the top of the packed column.

4. The hydro-pneumatic radon remover of claim 2 wherein there is a gas manifold above the top of said packed column, and the inlet of said blower is positioned so that it draws gas from said manifold, and the outlet of said blower is positioned exteriorly of said gas manifold.

5. The hydro-pneumatic radon remover of claim 4 wherein said carbon absorber is positioned above said gas manifold and below said blower.

6. The hydro-pneumatic radon remover of claim 2 wherein said pressure vessel is installed so that a portion of the vessel is above ground level and a portion of the vessel is below ground level so that the bottom of the vessel and the water level in the vessel are below ground level and the carbon absorber is positioned at about nine feet above ground level.

7. The hydro-pneumatic radon remover of claim 2 further including a pressurized gas supply source controlled by said means for maintaining a desired water level.

8. The hydro-pneumatic radon remover of claim 2 wherein the water level within said vessel is controlled by a source of compressed air at a pressure above that of the inlet water to be treated and an air control valve controlled by a controller which senses the level of water in the bottom of the vessel.

* * * * *